Aug. 15, 1939.  P. D. SMITH  2,169,906
DIRECTION SIGNAL DEVICE FOR AUTOMOBILES
Filed April 3, 1937  4 Sheets-Sheet 1
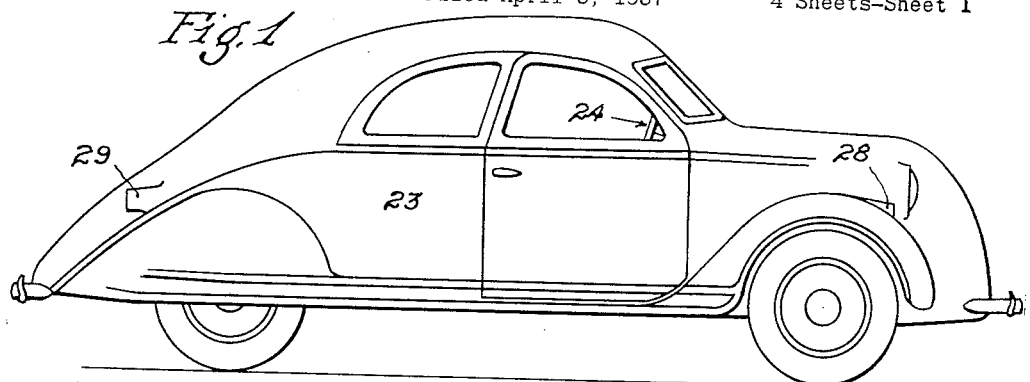
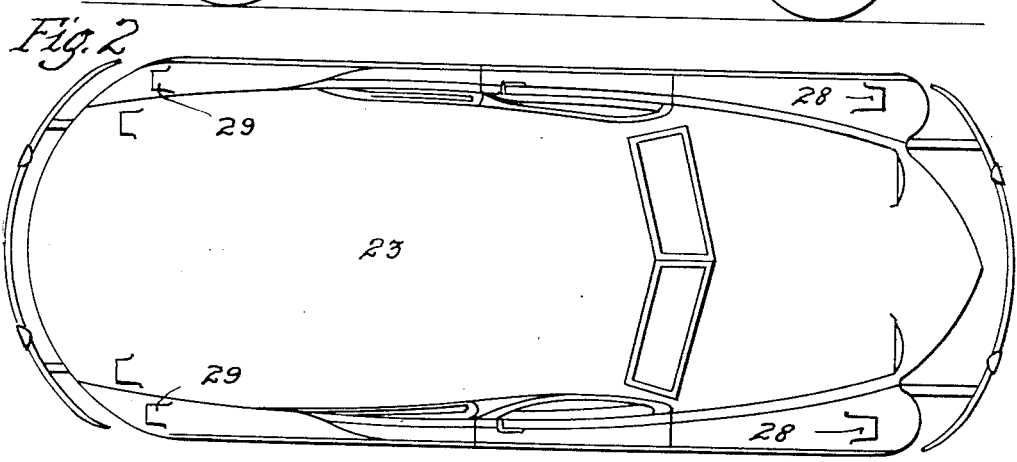
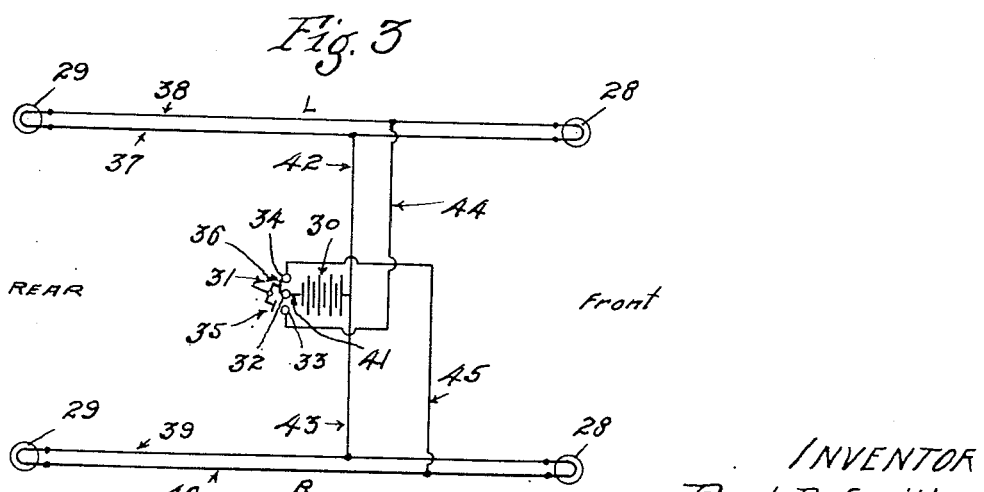
INVENTOR
Paul D. Smith
By his Attorneys
Merchant & Kilgore

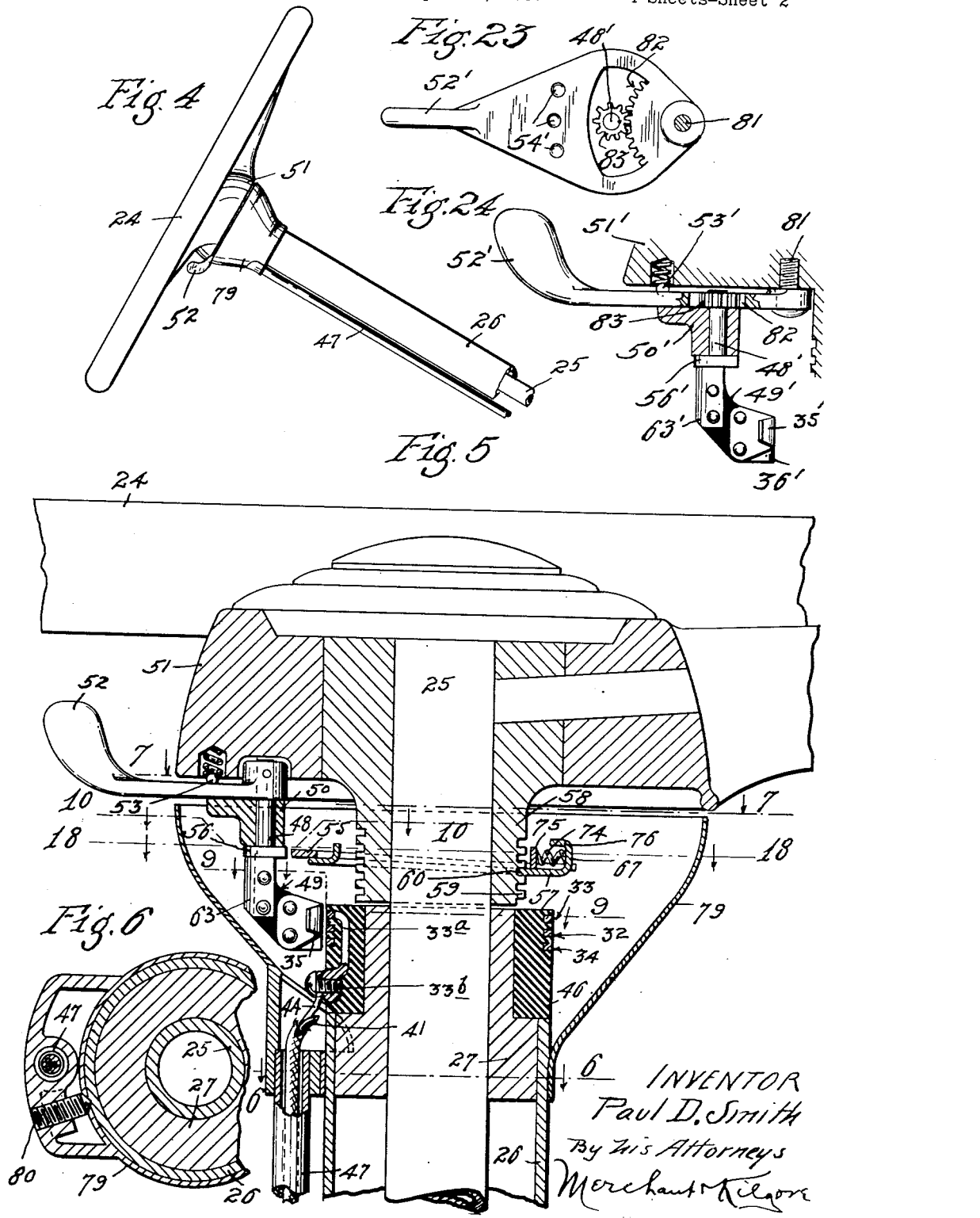

Aug. 15, 1939.　　　　P. D. SMITH　　　　2,169,906
DIRECTION SIGNAL DEVICE FOR AUTOMOBILES
Filed April 3, 1937　　　4 Sheets-Sheet 3
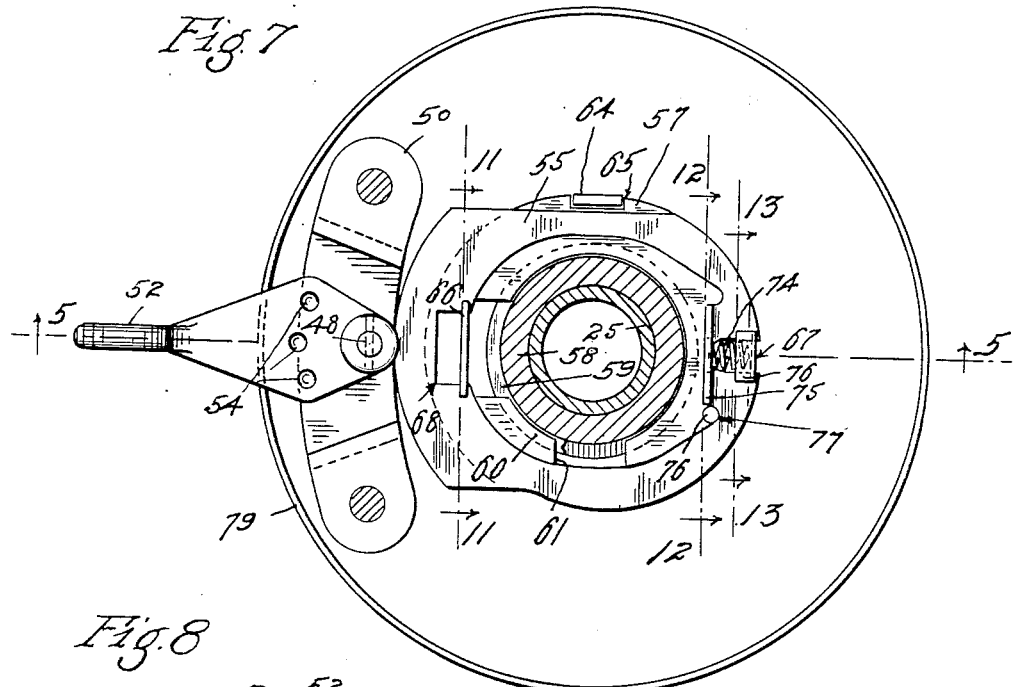
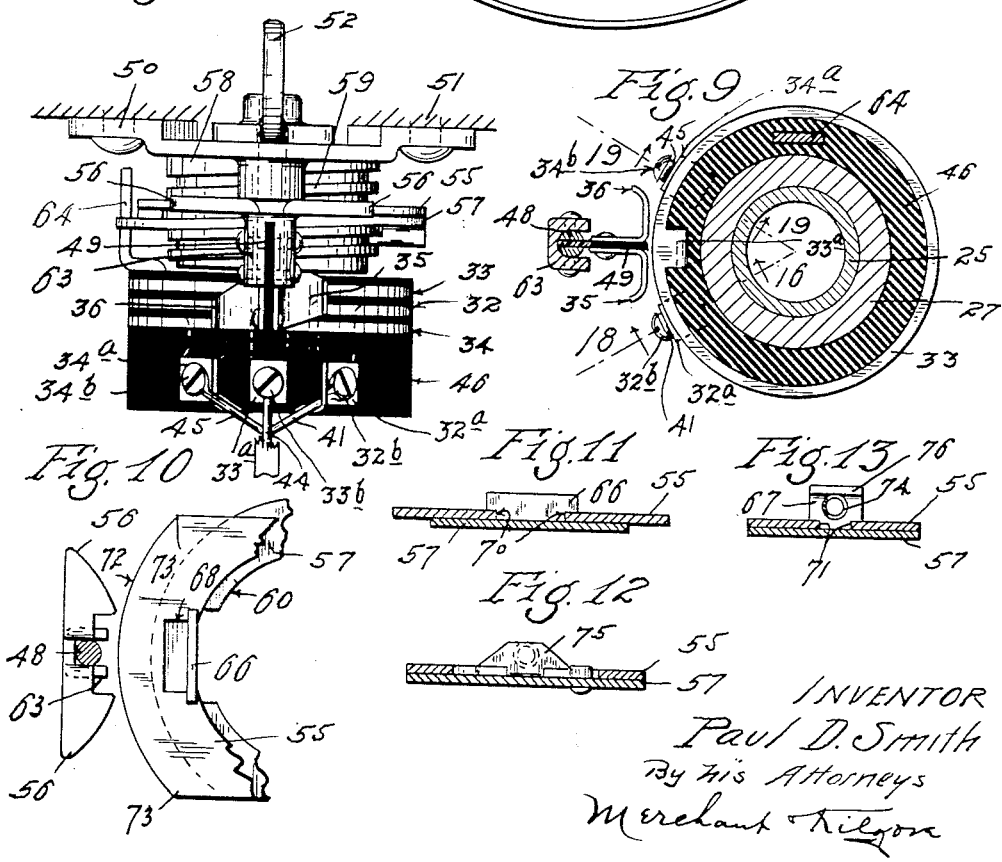
INVENTOR
Paul D. Smith
By his Attorneys
Merchant & Kilgore Aug. 15, 1939.　　　　P. D. SMITH　　　　2,169,906
DIRECTION SIGNAL DEVICE FOR AUTOMOBILES
Filed April 3, 1937　　　　4 Sheets-Sheet 4
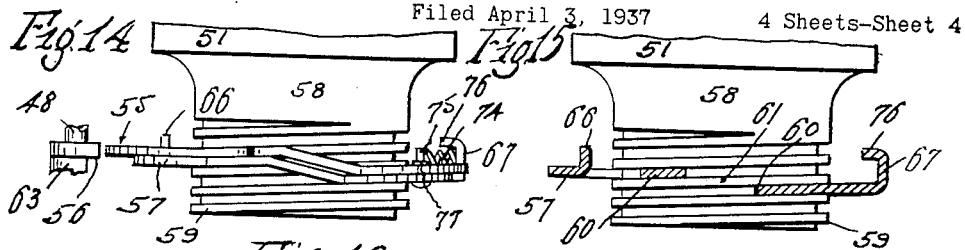
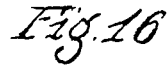
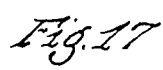
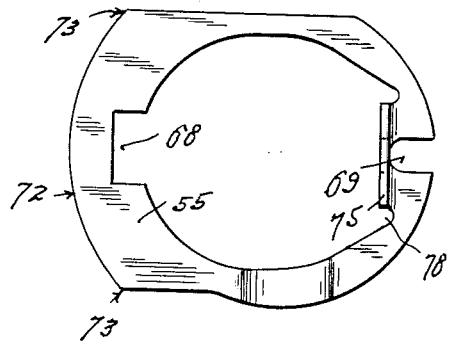
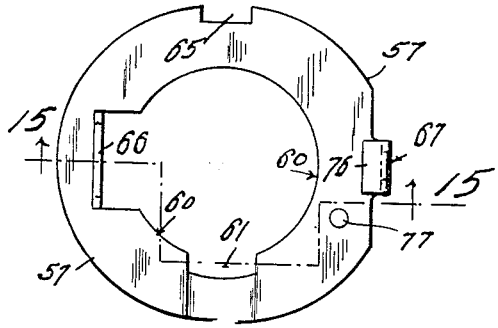
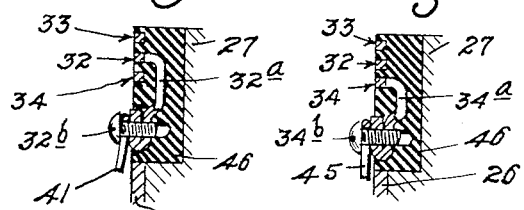
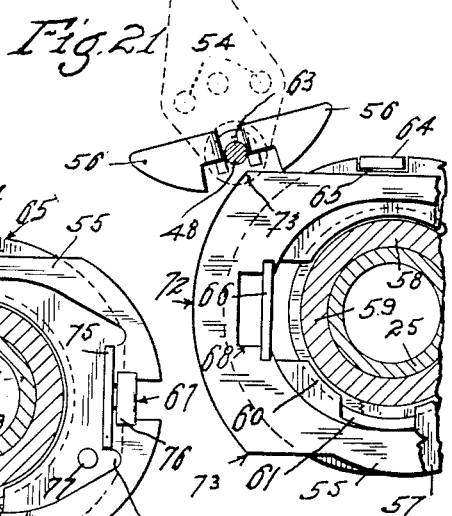
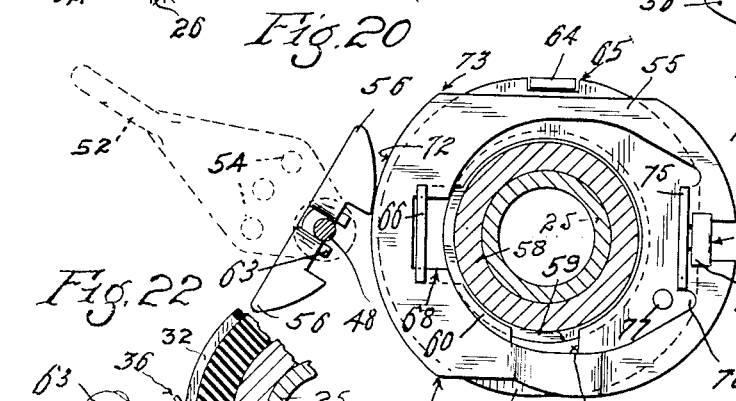
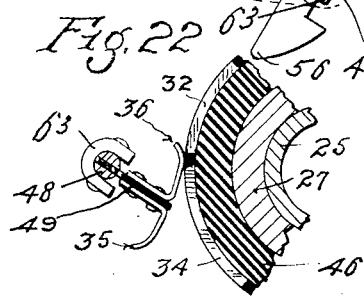
INVENTOR
Paul D. Smith
By his Attorneys
Merchant & Kilgore Patented Aug. 15, 1939

2,169,906

UNITED STATES PATENT OFFICE 2,169,906

DIRECTION SIGNAL DEVICE FOR AUTOMOBILES

Paul D. Smith, Beloit, Wis.

Application April 3, 1937, Serial No. 134,743

7 Claims. (Cl. 200—59)

My present invention relates to direction signal devices for automotive vehicles.

One of the objects of the invention is the provision of such a device that is efficient in use and practical in construction and which construction provides for the embodiment of the operating mechanism of the device within the hub of the steering wheel, whereby the same is completely encased with the exception of the switch handle which is exposed where the same may be easily operated by the driver of the vehicle. For the sake of brevity the term automotive vehicle is hereinafter referred to in a broad sense as an automobile.

Further objects of the invention will appear from the detailed description to follow and from the appended claims.

In the accompanying drawings, which illustrate the invention, like characters indicate like parts throughout the several views.

Referring to the drawings:

Fig. 1 is a right hand elevation of an automobile diagrammatically illustrated and having the invention embodied therein;

Fig. 2 is a plan view of the same;

Fig. 3 is a wiring diagram;

Fig. 4 is a fragmentary view in elevation showing the steering wheel and the steering column;

Fig. 5 is a fragmentary view, on an enlarged scale, partly in side elevation and partly in vertical section, taken on the line 5—5 of Fig. 7;

Fig. 6 is a fragmentary detail view principally in section taken on the line 6—6 of Fig. 5;

Fig. 7 is a view partly in plan and partly in section taken on the line 7—7 of Fig. 5;

Fig. 8 is an elevation of certain of the parts shown in Fig. 7, and looking at the same from the left with respect to Fig. 7;

Fig. 9 is a view principally in section taken on the irregular line 9—9 of Fig. 5;

Fig. 10 is a fragmentary detail view partly in plan and partly in section taken on the line 10—10 of Fig. 5;

Figs. 11, 12 and 13 are detail views principally in section taken, respectively, on the lines 11—11, 12—12, and 13—13 of Fig. 7;

Fig. 14 is a fragmentary view in side elevation of certain of the parts shown in Fig. 8 and looking at the same from the right in respect thereto;

Fig. 15 is a view corresponding to Fig. 14 with the exception that certain parts are removed and the nut is sectioned on the irregular line 15—15 of Fig. 17;

Figs. 16 and 17 are plan views of the ratchet and the nut, respectively, removed from the parts associated therewith;

Figs. 18 and 19 are fragmentary detail views principally in section taken on the lines 18—18 and 19—19 of Fig. 9, respectively;

Fig. 20 is a view corresponding to Fig. 7 with the exception that the switch handle, indicated by broken lines, has been positioned to close the circuit for the right hand signal lamps to indicate that a right hand turn is about to be made and for operating the dogs to retract the ratchet;

Fig. 21 is a view corresponding to Fig. 20 with the exception that the switch handle and dogs have been moved with the steering wheel, during its return movement to normal position, until one of the dogs is in position to engage the ratchet and be automatically tripped thereby to open the circuit for the right hand signal lamps;

Fig. 22 is a fragmentary detail view showing the movable switch contacts as set by the switch handle when positioned, as shown by broken lines in Figs. 20 and 21, to engage the lower and intermediate contact rings and close the circuit of the right hand signal lamps;

Fig. 23 is a plan view showing a modification of the switch handle and certain parts associated therewith; and Fig. 24 is a view principally in side elevation of the parts shown in Fig. 23.

Referring first to the invention shown in Figs. 1 to 22, inclusive. The automobile shown in Figs. 1 and 2 is indicated, as an entirety, by the numeral 23 with the exception of the steering wheel 24, the steering shaft 25, and the steering column 26. Fixed in the upper ends of the steering column 26 is a bearing 27 in which the steering shaft 25 is turnably mounted.

The improved device, for indicating the direction in which an automobile is about to be turned, includes a front lamp 28 and a rear lamp 29, on each side of the vehicle 23, and which lamps are preferably, but not necessarily, mounted on the fenders of said vehicle. If the vehicle 23 is to be turned to the left, the two left hand lamps 28 and 29 are lighted; on the other hand, if the vehicle is to be turned to the right, the right hand lamps 28 and 29 are lighted. Obviously, the two front lamps 28 are individually used to warn persons in front of the vehicle 23 the direction in which said vehicle is about to be turned, while the two rear lamps 29 are individually used to warn persons at the rear of said vehicle the direction in which said vehicle is about to be turned.

The circuit for the two front lamps 28 and the two rear lamps 29 includes a battery 30 and a switch 31 having contact rings 32, 33 and 34, a movable contact 35 for connecting the contact rings 32 and 33, and a movable contact 36 for connecting the contact rings 32 and 34. A pair of wires 37 and 38 connect the left hand lamps 28 and 29 and a pair of wires 39 and 40 connect the right hand lamps 28 and 29. The contact ring 32 is connected by a wire 41 to one side of the battery 30 and wires 42 and 43 connect the other side of said battery to the wires 37 and 39, respectively. A wire 44 connects the contact ring 33 to the wire 38 and a wire 45 connects the contact ring 34 to the wire 40. Obviously, when the contact rings 32 and 33 are connected by the movable contact 35, the circuit for the left hand lamps 28 and 29 is closed, and when the contact rings 32 and 34 are connected by the movable contact 36, the circuit for the right hand lamps 28 and 29 is closed.

The three contact rings 32, 33 and 34 are embedded, except for their outer or contact surfaces, in a cast or molded collar 46 and held axially spaced thereby, the one from the other, see Figs. 5 and 8. This collar 46, which is made from an insulating material, is fixed to the reduced upper end portion of the bearing 27 and held thereby against rotation relative to the steering wheel 24. The contact rings 32, 33 and 34 have integral therewith inwardly and downwardly projecting arms 32a, 33a and 34a, the lower end portions of which are exposed through the perimeter of the collar 46 at circumferentially spaced points and provided with binding screws 32b, 33b, and 34b to which the wires 41, 44 and 45 are connected, respectively, at one of their ends. It will be noted that the lower end portion of the arms 32a, 33a and 34a are folded upon themselves to afford the necessary thickness for threaded engagement with the binding screws.

The wires 41, 44 and 45 are carried from the binding screws 32b, 33b and 34b to a point below the floor of the vehicle in a conduit 47 which extends parallel to the steering column 26 on the back or under side thereof.

The movable contacts 35 and 36 are rigidly secured to the lower end portion of a short upright shaft 48 by a thin insulating member 49. This member 49 is fitted in a slot in the shaft 48, projects radially therefrom between the two contacts 35 and 36 and insulates the same from the shaft 48. These contacts 35 and 36 are in the form of thin spring metal blades that project in opposite directions from the member 49 and circumferentially relative to the collar 46, see Figs. 8 and 9. The shaft 48, above the member 49, is journaled for rocking movement in a bearing 50 rigidly secured to the hub 51 of the steering wheel 24 at the under side thereof.

A switch handle 52, pinned to the shaft 48 and supported on the bearing 50, is provided for operating said shaft, and hence, the movable contacts 35 and 36. For yieldingly holding the switch handle 52 latched in any one of three predetermined positions, there is provided a spring-pressed friction ball 53 carried by the steering wheel hub 51 and arranged to enter any one of three depressed seats 54 in the upper face of said handle and circumferentially spaced about the axis of the shaft 48.

As the automobile 23 is completing its turning movement, either to the left or the right, the switch handle 52 is automatically returned to normal position to operate the movable contacts 35 and 36 and break the circuit for the set of lamps 28 and 29, lighted to indicate prior to the turning movement of the vehicle, the direction in which said automobile was about to be turned.

The mechanism for automatically returning the switch handle 52 to normal position includes a double-acting pawl 55, a pair of co-operating dogs 56, and a nut 57 on which the pawl is mounted. It may be here stated that the purpose of the nut 57 is to move the pawl 56 out of the path of the dogs 56 during steering movement, to turn the automobile either to the left or to the right and to return said pawl to operative position just prior to the completion of said turning movement. The steering hub 51 has a fixed depending extension 58 that is of less diameter than the collar 46 and axially aligned therewith. This hub extension 58 is provided with a screw-thread 59 with which the thread 60 on the nut 57 meshes. Said thread 60 is slightly less than a single convolution which leaves a gap 61 between the ends thereof, allowing for the passage of the lead of the thread 59 on the hub extension 58, see Figs. 15 and 17.

The two dogs 56 are rigidly secured to the shaft 48 by a depending split sleeve 63 formed therewith and encircling the shaft 48 below the bearing 50. By reference to Figs. 20 and 21, it will be noted that the dogs 56 project in opposite directions from the shaft 48 and circumferentially relative to the collar 46.

By reference to Fig. 5, it will be noted that the switch handle 52 and the dogs 56, by their engagement with opposite sides of the bearing 50, hold the shaft 48 against endwise movement in said bearing.

The nut 57 is held against rotation relative to the turning movement of the hub extension 58 by a flat upstanding post 64. This post 64 is anchored at its lower end in the insulating collar 46, loosely extends through a notch 65 in the perimeter of the nut 57 and permits axial movement of the nut 57 during relative rotation of the hub extension 58 therein.

The pawl 55 is mounted on the nut 57 for sliding movement toward and from the dogs 56 and has a central aperture through which the hub extension 58 projects with freedom to permit the required sliding movement thereof on the nut 57. The pawl 55 is held for straight line sliding movement on the nut 57 by a pair of diametrically opposite upstanding guide lugs 66 and 67 on said nut, the former of which extends into an internal notch 68 in the pawl 55 and the latter of which extends into an external notch 69 in said pawl. By reference to Fig. 11, it will be noted that the lug 66 has in its ends notches 70 into which the pawl 55, at the sides of the notch 67, slidably extend, and the lug 67, see Fig. 13, also has in its ends notches 71 into which said pawl, at the sides of the notch 69, slidably extends. Obviously, the sliding interlocking engagement of the pawl 55 with the notches 70 and 71 holds the pawl 55 against lifting movement from the nut 57.

It will be noted, by reference to Fig. 20, that the pawl 55, adjacent to the dogs 56 when the steering wheel 24 is set to hold the automobile for straight line travel, is on the arc of a circle which affords a curved surface 72, the center of which is at the axis of the steering shaft 25. The sides of the pawl 55, at the ends of the surface 72, are parallel, equal distances from the center of said pawl and afford trip shoulders 73 at the said ends of the pawl 55 for the dogs 56. When the switch handle 52 is in normal position, the pawl 55 is yieldingly held projected toward the dogs 56 by a coiled spring 74 held between the guide lug 67, which is on the nut 57, and an upstanding lug 75 on the adjacent end of the pawl 55. On the upper end of the guide lug 67 is a retaining lip 76 for the spring 74. The projecting movement of the pawl 55, relative to the nut 57 by the spring 74, is limited by a fixed pin 77 on said nut which projects upwardly through the aperture in the pawl 55 and into an open seat 78 in said pawl.

It may be here stated that, in some types of steering mechanisms for automotive vehicles, substantially two complete turns of the steering wheel is required to turn the vehicle on a sharp curve, either to the left or the right, and that the screw-thread 59, on the hub extension 58, has sufficient convolutions to permit the required travel of the nut 57 to make such a turn.

When the switch handle 52 is in normal position, while the steering mechanism is set for straight travel of the vehicle, the dogs 56 are in the plane of the pawl 55.

The invention embodied in the steering wheel 24 and steering column 26 is within a casing 79 attached to said steering column. From a broad point of view the casing 79 forms a part of the steering wheel hub 51. Said casing 79, at its lower end, fits around the steering column 26 and is rigidly but releasably secured thereto by a set-screw 80. The casing 79, at its upper end, is of substantially the same diameter as the under side of the hub 51 and has a loose working fit therewith. The conduit 47, at its upper end, is secured to the casing 79 and the wires 41, 44 and 45 lead therefrom into the casing 79 where they are attached, respectively, to binding screws 32b, 33b and 34b.

In the construction just described and shown in Figs. 1 to 22, inclusive, it is necessary in signalling for a turning movement to move the switch handle 52 in an opposite direction from that in which the vehicle is to be turned, or, in other words, if the vehicle is to be turned to the right, it is necessary to move the switch handle 52 to the left and vice versa. The switch handle 52', shown in the modification Figs. 23 and 24, must be moved in the same direction in which the vehicle is to be turned. To accomplish this result the switch handle 52' is pivoted at 81 to the steering wheel hub 51' and provided with an internal toothed segment 82 which meshes with a pinion 83 fixed to the upper end of the shaft 48' journaled in the bearing bracket 50'.

The movable contacts 35' and 36' are connected with the shaft 48' by the elements 49' and 63' and which elements correspond to the elements 49 and 63, respectively. Fixed to the shaft 48', above the elements 63', is a pair of dogs 56' and the switch handle 52' is yieldingly held where set by a spring-pressed friction ball 53' arranged to enter any one of the three seats 54' in the switch handle 52'.

From the description of Figs. 23 and 24, it is evident that when the switch handle 52' is moved either to the right or the left, it will rock the shaft 48' and through connections 82 and 83 impart a reverse movement to the movable contacts 35' and 36' from that of said switch handle.

*Operation*

When the steering mechanism is set for straight line travel and the driver decides to make, say a right hand turn, he moves the switch handle 52 to the left, as shown by broken lines in Fig. 20. This setting of the switch handle 52 should be made some time prior to the actual turning movement of the vehicle in order to give the proper signal in advance of the actual turning of the vehicle. In this position of the switch handle 52 the friction ball 53 is in the left hand seat 54 and yieldingly holds said handle where set. This movement of the switch handle 52 causes the left hand dog 56 to engage the surface 72 on the pawl 55 and move said pawl relative to the nut 57 against the tension of the spring 74. At this same time, the movable contact 36 is moved into engagement with the contact rings 32 and 34 which close the circuit for the right lamps 28 and 29 and light the same. Persons both in the front and in the rear of the vehicle will be warned by the lighted lamps that said vehicle is about to make a right hand turn.

It may be here stated the length of the surface 72 is such that the dog 56 engaging the same will not move out of engagement therewith during ordinary driving straight ahead, which necessitates more or less turning movement of the steering wheel 24 in passing vehicles and the like.

When making this right hand turn the steering wheel 24, that is the upper half thereof, is being moved to the right and after a predetermined movement thereof, the left hand dog 56 will be moved out of engagement with the pawl 55, the spring 74 will project said pawl into its normal position, see Fig. 21. During turning movement of the steering wheel 24 for a right hand turn, the nut 57 and hence the pawl 55 carried thereby, is being moved upwardly on the hub extension 58 so that in case the steering wheel 24 makes one complete turn or more the operative dog 56 will pass under the projected pawl 55. On the other hand, if the steering wheel 24 is being moved to make a left hand turn, the nut 57 and pawl 55 are being moved downwardly on the hub extension 58 and the operative dog 56 will pass over the projected pawl 55 in case the steering wheel 24 makes one complete rotation or more.

At the completion of a right hand turn, the movement of the steering wheel 24 is reversed for straight line travel. During this return movement of the steering mechanism, the nut 57 and the pawl 55 are being moved downward on the hub extension 58 to position the pawl 55 in the plane of the dogs 56, whereby the left hand dog 56 will engage the left hand corner 73 of the projected pawl 55 and be moved thereby about the axis of the shaft 48. This movement of the left hand dog 56 turns the shaft 48 about its axis and again positions the switch handle 52 in neutral position in which the friction ball 53 is the intermediate seat 54.

This return movement of the switch handle 52 to neutral position also carries the movable contact 56 out of engagement with the contact rings 32 and 34 and thereby breaks the circuit for the right hand lamps 28 and 29 which completes the signalling action for a right hand turn.

To signal for a left hand turn, the switch handle 52 is turned to the right to light the left hand lamps 28 and 29 and move the contact 35 into engagement with the contact rings 32 and 33 to close the circuit for said left hand lamps. During the completion of a left hand turn, the right hand dog 56 engages the right hand corner 73 of the pawls 55 and automatically returns the switch handle 52 to neutral position and also moves the contact 35 out of engagement with the contact rings 32 and 33 and breaks the circuit for said left hand lamps 28 and 29.

The operation just described has been with reference to the structures shown in Figs. 1 to 22, inclusive.

When the modification shown in Figs. 23 and 24 is embodied in the signal device, the only difference in the operation thereof, from that just described, is that the switch handle 52' is turned in the same direction in which the vehicle is about to be turned.

The above described device is capable of various modifications within the scope of the invention herein disclosed and claimed.

What I claim is:

1. The combination with a relatively fixed hollow steering column and a turnable steering shaft in said column, of a normally open switch including a ring contact on the steering column and a co-operating manually operable movable contact on the steering shaft, a trip device including a pair of co-operating members, one of which is on the steering column and the other of which is on the steering shaft, for returning the movable contact to neutral position during completion of turning movement of the steering shaft, and automatic means for moving one of said trip members into an inoperative position during initial turning movement of the steering shaft in a given direction and for returning the same to an operative position during completion of said turning movement.

2. The combination with a relatively fixed hollow steering column and a turnable steering shaft in said column, of a normally open switch including a ring contact on the steering column and a co-operating manually operable movable contact on the steering shaft, a trip device for returning the movable contact to neutral position during completion of turning movement of the steering shaft, said trip device including a dog movable with the movable contact and a co-operating pawl on the steering column, and automatic means for moving the pawl out of the path of movement of the dog during initial turning movement of the steering shaft in a given direction and for returning the pawl into said path of movement during completion of said turning movement.

3. The structure defined in claim 2 in which the automatic means includes a nut-acting member mounted on the steering shaft by means of screw-threads and held against relative rotation and on which member the pawl is mounted.

4. The combination with a relatively fixed hollow steering column and a turnable steering shaft in said column, of a normally open switch including a pair of ring contacts on the steering column and a pair of co-operating manually operable movable contacts on the steering shaft, a trip device including a pair of reversely acting dogs movable with the movable contacts and a double-acting pawl on the steering column, and automatic means for moving the pawl out of the path of movement of the dogs during initial turning movement of the steering shaft, either to the right or the left, and for returning said pawl into said path of movement during completion of said turning movement.

5. The structure defined in claim 4 in which the automatic means includes a nut-acting member mounted on the steering shaft by means of screw-threads and held against relative rotation and on which member the pawl is mounted.

6. The structure defined in claim 2 in which the automatic means includes a nut-acting member mounted on the steering shaft by means of screw-threads and held against relative rotation and on which member the pawl is slidably mounted and yieldingly held.

7. The combination with a relatively fixed hollow steering column and a turnable steering shaft in said column, of a normally open switch which includes upper and lower contact members on the steering column, a rock shaft substantially parallel to the steering column and journaled on a part carried thereby, a switch handle for operating the rock shaft, and a pair of contacts on the rock shaft and movable therewith, one of the movable contacts being arranged to engage the upper contact by manual movement of the switch handle to one side of neutral position and the other movable contact being arranged to engage the lower contact by manual movement of the switch handle to the other side of neutral position, a trip device for returning the rock shaft to neutral position during the completion of turning movement of the steering shaft, either to the right or to the left, said trip device including a pair of reversely-acting dogs on the rock shaft and a co-operating double-acting pawl on the steering column.

PAUL D. SMITH.